Sept. 2, 1969  K. BECKER  3,464,547

BOTTLE TESTING ARRANGEMENT

Filed Aug. 25, 1966  5 Sheets-Sheet 1

INVENTOR
Kurt Becker by
Michael J. Striker
Atty

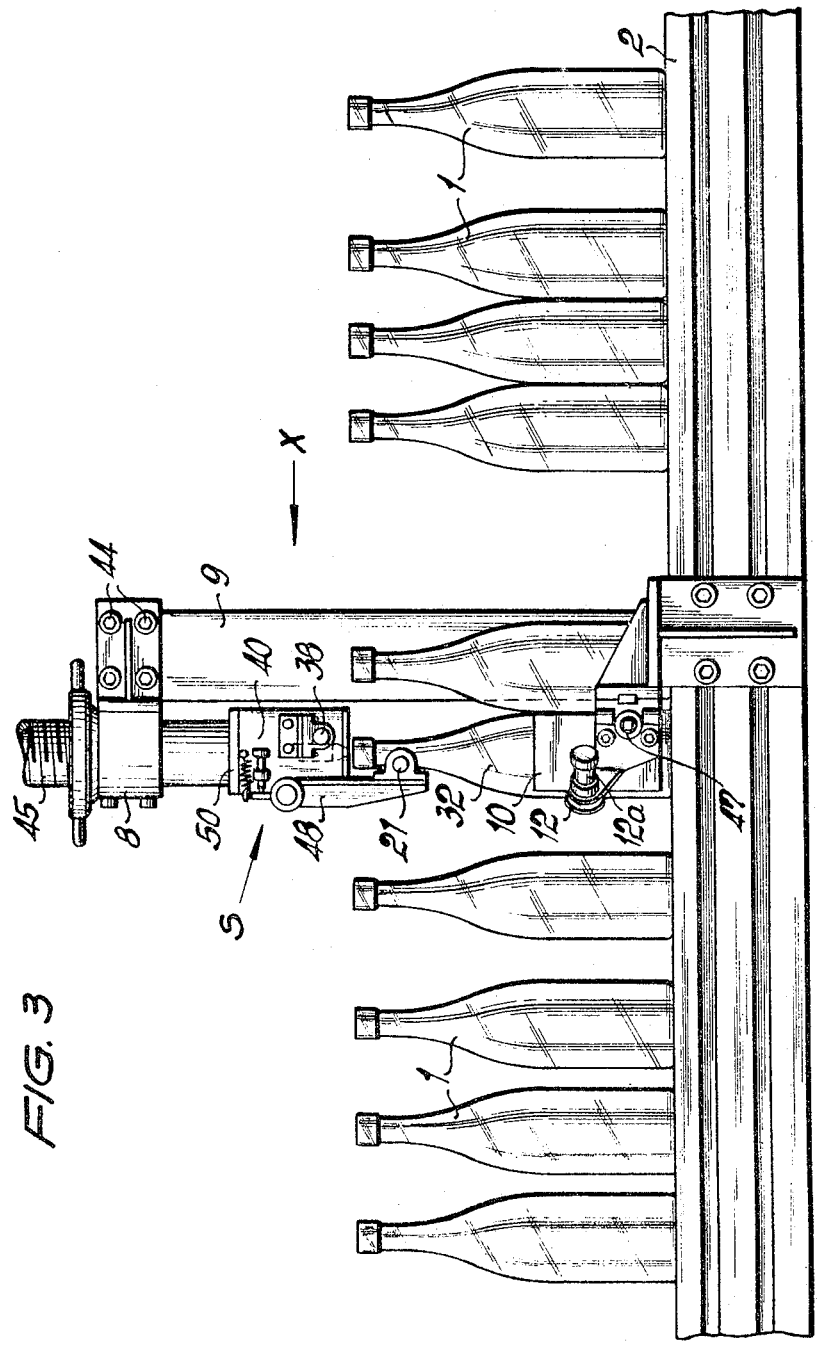

Sept. 2, 1969  K. BECKER  3,464,547
BOTTLE TESTING ARRANGEMENT
Filed Aug. 25, 1966  5 Sheets-Sheet 4

INVENTOR
Kurt Becker
by Michael J. Striker
Attorney

INVENTOR
Kurt Becker
by Michael J. Striker

United States Patent Office 3,464,547
Patented Sept. 2, 1969

3,464,547
BOTTLE TESTING ARRANGEMENT
Kurt Becker, Obernkirchen, Germany, assignor to Hermann Heye, Obernkirchen, Germany
Filed Aug. 25, 1966, Ser. No. 574,999
Claims priority, application Germany, Aug. 25, 1965, H 56,967
Int. Cl. B07c *5/04, 1/10;* B07b *13/04*
U.S. Cl. 209—73     11 Claims

ABSTRACT OF THE DISCLOSURE

An arrangement for automatically testing bottles after manufacture and removing from the tested lot, defective bottles which are not within prescribed limits. The bottles to be tested are conveyed in sequence to a testing station. Through mechanical members and linkages each bottle is, in turn, firmly positioned in place beneath a testing head. A gage is lowered into the neck of the bottle after being positioned beneath the testing head. The gage is arranged so that if it will not be admitted into the neck of the bottle, the neck is designated to be too narrow and the bottle is removed from the process line as a reject. If, on the other hand, the gage enters the neck of the bottle too far in a downward direction, the opening of the bottle is designated as being too wide and the bottle is again rejected. The sensing of the position of the gage is accomplished through photoelectric effects and a pre-programmed electronic control circuit generates signals for performing the testing sequence and actuating the mechanisms for handling the bottles, including its rejection, through the testing process.

---

The present invention is related to an arrangement for detecting defectively manufactured bottles and removing them as rejects from a process line.

Heretofore, devices for testing the internal diameters or openings of bottles, were inflexible and new devices had to be introduced whenever bottles of different sizes or shapes were administered. Furthermore, the testing devices were slow in performing their functions and were considerably unreliable.

Accordingly, it is an object of the present invention to provide an arrangement for testing manufactured bottles to determine whether their internal diameters or openings, at the neck, are within specified tolerances.

Another object of the present invention is to provide an arrangement for testing manufactured bottles, as set forth, which rejects bottles whose internal diameters at the neck are either too small or too large.

Yet another object of the present invention is to provide an arrangement, of the character described, whereby the bottles to be tested are transferred on a conveyor to a testing station equipped to reject unacceptable bottles by removing them from the conveyor.

A further object of the present invention is to provide an arrangement for testing manufactured bottles, as set forth, employing photoelectric effects for gauging the internal diameter of the necks of bottles and for commencing the testing cycle.

A still further object of the present invention is to provide an arrangement for testing manufactured bottles, of the character described, which operates in a simple and economical manner, and functions reliably.

With the preceding objects in view the bottles to be tested are placed on a conveyor which transfers them beneath a testing station. When a bottle to be tested arrives at the testing station it interrupts a light beam which transmits, by way of a photoelectric cell, an impulse to control circuitry that actuates means for clamping the bottle in place beneath a testing gauge supported within a testing head at the station. When thus properly clamped, the testing gauge is lowered into the neck of the bottle to establish whether the neck is within the allowed tolerances. If the testing gauge is admitted too far into the bottle the opening of the neck is too large. If, on the other hand, the testing gauge is not admitted sufficiently into the bottle, the neck is designated as being too small. When the testing gauge enters the bottle to a predetermined extent, the internal opening at the neck of the bottle is within predetermined limits, and the bottle is acceptable. The distance which the test gauge penetrates to the bottle, is determined by the interruption of a light beam through a collar associated with the test gauge. The arrangement is such that only when the light beam is interrupted a single time, is the bottle acceptable. At all other times the bottle is rejected. Electronic circuitry operated by way of timing pulses determines the sequence of operation of the testing cycle, and assures that all events of the cycle take place in the proper sequence and at the proper instant of time. The electronic circuitry also resets the entire arrangement for effecting sequential testing cycles.

The novel features which are considered as characteristic of the invention are set forth in particular in the appended claims. The invention itself, however, both as to its additional objects and advantages thereof, will be best understood from the following description of specific embodiments when read in conjunction with the accompanying drawings, in which:

FIG. 3 is a front elevational view showing the bottles as they are moved to and from the testing station situated along the path of the conveyor;

Figure 7:
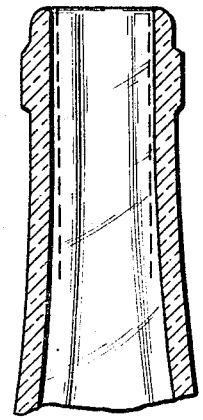
Figure 8A:
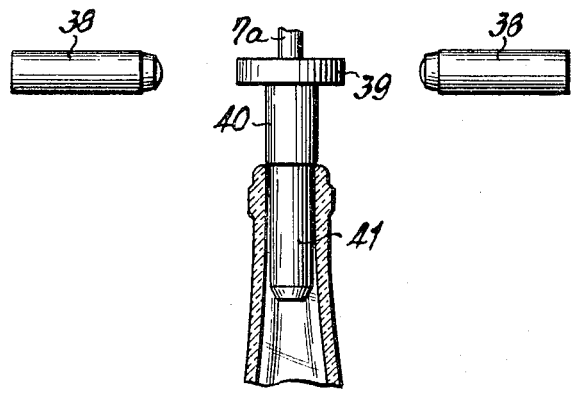
Figure 8B:
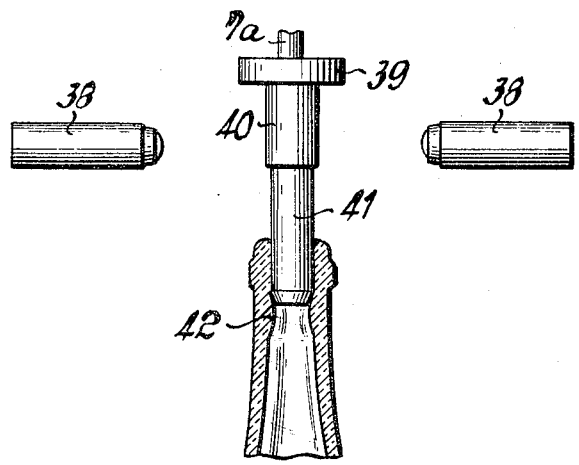
Figure 8C:
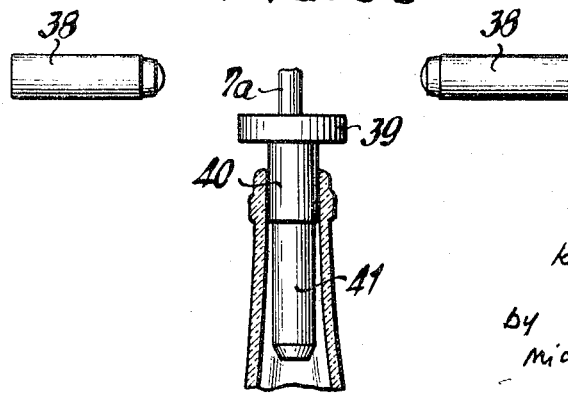

FIG. 7 is a cross-sectional view showing the condition when the bottle to be tested has an internal diameter, at its neck, which is larger than the predetermined limit; and FIG. 8 is a series of cross-sectional views showing the relationship of the testing gauge to the bottle being tested when the internal diameter, at the neck, is within the prescribed limits (FIG. 8a), is too small (FIG. 8b), is too large (FIG. 8c).

Referring to the drawing, the bottles 1 to be tested are conveyed to the testing station by means of a conveyor 2. The motion of the conveyor 2 and hence of the bottles 1, is in the direction of the indicating arrow marked X in FIG. 3. When approaching the testing station, the bottles may be located at varying distances from one another as shown in FIG. 3. The testing station checks the internal diameter of each bottle, and causes rejection of those bottles which do not conform with predetermined tolerance requirements in regard to the internal diameter of the bottles.

For the purpose of checking the internal diameter of each bottle to determine whether it falls within specified limits, a testing gauge 3 is lowered into the bottle. During the period that the bottle is being tested, it is firmly held between rollers 4 and contactor 5. The latter is operated by a pneumatic cylinder 6 and causes the bottle to be properly located between the rollers 4 during each testing cycle. The rollers 4 are situated within a holder 50 having a recess 50a so as to admit a portion of the sample bottle and thus form an accurate locating device. The position of holder 50 may be adjusted through means of rotation of the lead screw 47. The holder 50 is mounted on a carriage 10 which is movable in directions along the conveyor.

The testing gauge 3 is actuated through a pneumatic cylinder 7 held within the support 8. The support 8 is secured to the upright member 9 by means of clamping screws 44. The position of testing gauge may be adjusted by moving its assembly longitudinally with respect to the spindle 45. A clamping member 46 secures the testing gauge in the desired position and at the proper height above the bottles being tested.

Figure 5:
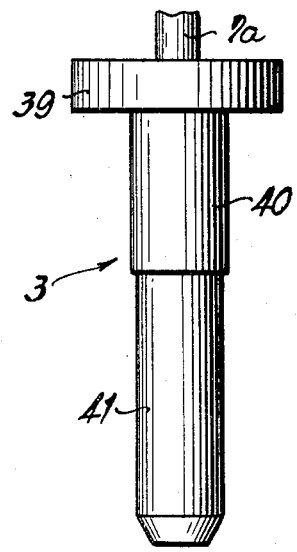
FIG. 5 is a front view showing the construction of the testing gauge.
Figure 6:
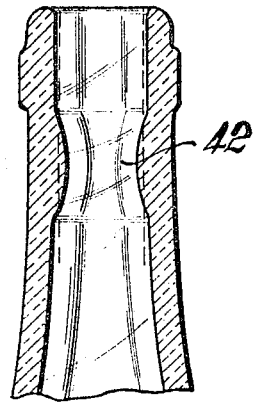
FIG. 6 is a cross-sectional view showing the conditions when the bottle to be tested has an internal diameter, at its neck, which is too small.

The construction of the test gauge 3 is shown in detail in FIG. 5. The test gauge comprises substantially a small diameter portion 41, a large diameter portion 40, a collar 39, and a section 7a secured to the piston of the pneumatic cylinder 7. The test gauge is designed to check the internal diameter of the neck of the bottle. The internal diameter may be defective by being either too small, as shown in FIG. 6, or too large as shown in FIG. 7. The internal diameter of the bottle may be made too small as a result of a projection 42 within the bottle. In either FIG. 6 or 7, the dotted lines illustrate the correct internal diameter of the neck of the bottle. In FIG. 7, in contrast to FIG. 6, the neck of the bottle is too large and the dotted lines fall within the internal diameter of the bottle. FIG. 8 illustrates the position of the test gauge for the varying conditions that may prevail with regard to the internal diameter of the neck of the bottle being tested. In FIG. 8a, for example, the internal diameter of the neck of the bottle is within the desired tolerances and the cylindrical portion 41 passes into the bottle without allowing the cylindrical portion 40 to also enter the neck of the bottle. In FIG. 8b the neck of the bottle is too small as a result of the projection 42 and, accordingly, the cylindrical portion 41 of the test gauge is not free to enter, fully, into the bottle. In FIG. 8c the condition is illustrated where the internal diameter of the bottle is too large and allows thereby the cylindrical portion 40 as well as 41 to enter the neck of the bottle.

A light beam, generated by the sources 38, is directed transverse to the axis of movement of the test gauge. The light beam operates in conjunction with the collar 39 to translate the condition of the bottle in terms of automatic controlling signals. The apparatus 38 operates on the principle of a photocell against which a light beam is directed. Whenever the light beam is interrupted, the photocell generates impulses which may be routed for controlling purposes. Thus, in FIG. 8a the collar 39 interrupts the light beam and causes thereby an impulse to be generated in the photocell. This impulse may be registered as implying that the bottle is a good sample. When the internal diameter of the bottle is too small, as shown in FIG. 8b, the light beam is not interrupted by the collar 39 and this non-interruption of the light beam during this test cycle may be registered as a bad sample and hence a reject. In FIG. 8c the collar interrupts the light beam on its way into the bottle whose internal diameter is larger than the desired dimension, but this light beam becomes interrupted a second time when the test gauge is withdrawn. Accordingly, two interruptions of the light beam may also be registered as a reject sample. It may be seen, therefor, that the relationship between the collar and the light beam is unique, and that only under the condition that the light beam be interrupted a single time, is the sample a good one. At all other times the sample is to be rejected.

A second light beam apparatus 21 is supported by a holder 48. The position of the holder 48 and hence of light apparatus 21 may be varied as a result of turning the adjusting screw 49 against the action of spring 50. This adjustment allows for varying designs of bottles to be processed. The purpose of the light apparatus 21 is to generate an impulse signal whereby the bottles may be firmly gripped and held against the rollers 4 as a result of plunger or actuator 5. If a bottle, as shown in FIG. 3, has a wider or narrower outside neck diameter, the position of the light apparatus 21 must be varied accordingly, in order to assure that the light beam is interrupted at the proper instant so that the bottle to be tested may be located precisely beneath the testing gauge.

Figure 1:
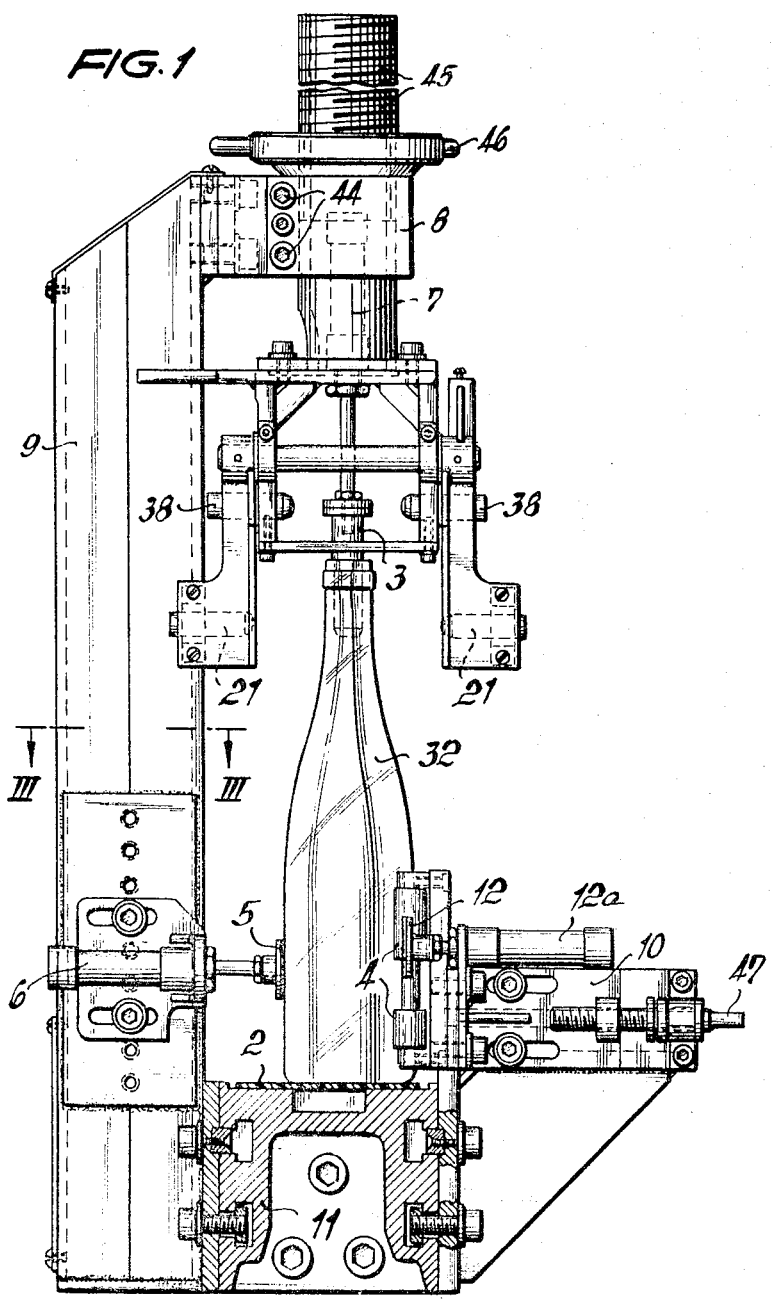
FIG. 1 is a cross-section of an elevational view perpendicular to the motion of the conveyor carrying the bottles to the testing station, and shows a bottle in position and in the process of being tested.
Figure 2:
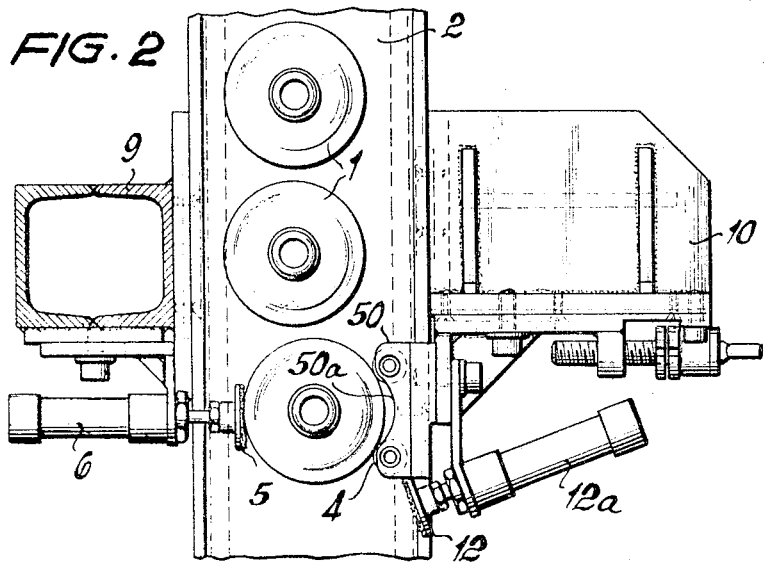
FIG. 2 is a partial top view of FIG. 1, and shows the clamping arrangement which holds the bottle in place while being tested.
Figure 4:
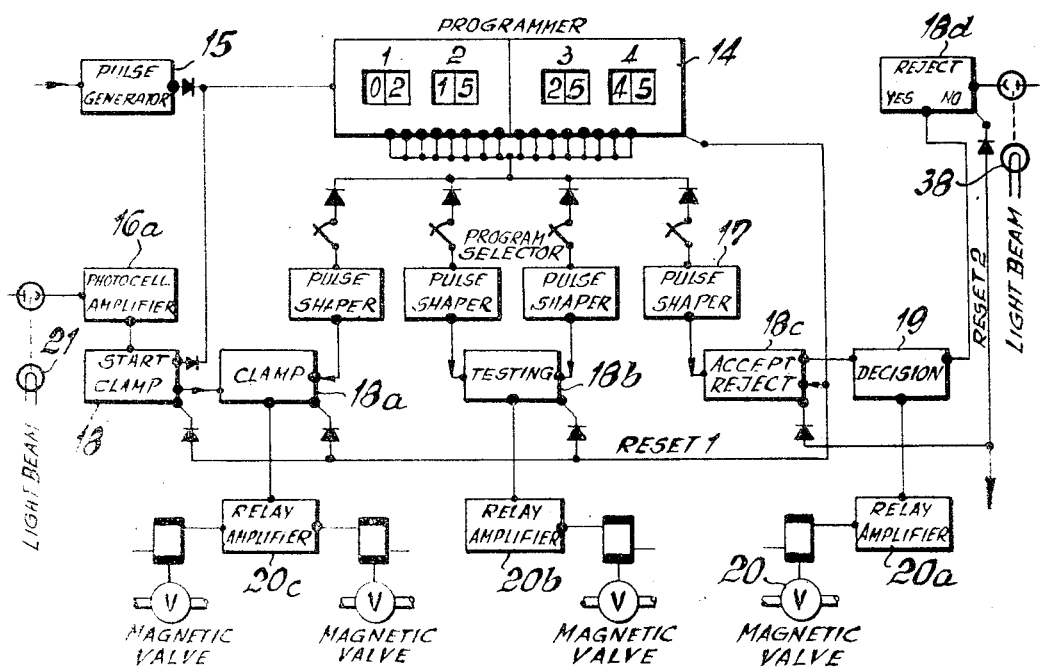
FIG. 4 is an electrical block diagram showing the control circuitry for sequencing and timing the various operations within the testing cycle.

In the event that the test gauge 3 generates signals, as a result of the interruption of the light beam by collar 39 indicating that the bottle being tested is a reject, pneumatic cylinder 12a actuates piston 12 to remove the bottle from the conveyor line. Thus, when piston or actuator 12 strikes against the reject bottle, the latter is pushed off the conveyor, and as a result only the accepted bottles are passed along. The sequence of operations of the testing cycle is determined by the controlling circuit of FIG. 4. A pulse generator 15 transmits timing pulses to a programmer 14. The programmer includes a counting device for maintaining a count on the sequence of the pulses. The pulses are transmitted by way of a program selector to pulse shapers 17. When the light beam associated with light apparatus 21 is interrupted, the impulse generated thereby is amplified by amplifier 16a and transmitted to the storage circuit 18. The storage circuit 18 stores the command to clamp the bottle in place and to commence the testing cycle. Therefore, when actuated by the signals from circuit 16a, the storage circuit transmits a signal to the programmer 14 to commence the testing cycle, and to the clamping circuit 18a. The latter will transmit a signal to relay amplifier 20c for actuating the clamping mechanism, when receiving a coincidence signal from programmer 14 by way of the pulse shaper 17. The pulse shaper 17 may be in the form of Schmitt triggers. A relay amplifier operates magnetic valves that control the pneumatic cylinders which, in turn, operate the clamping mechanism.

After the clamping process has been completed, as determined by the number of timing pulses registered by the programmer 14, the test gauge 3 is actuated for checking the internal diameter of the bottle. This is accomplished by transmitting pulses from the programmer 14 to the storage element 18b by way of the pulse amplifiers 17. The storage element 18b stores the control signal for actuating the testing gauge and operates, when required, the relay amplifier 20b which, in turn, transmits to its associated magnetic valve. After the elapse of a predetermined number of timing pulses, as registered by the programmer 14, the operation of the testing gauge is completed, and a signal is transmitted to the storage element 18c indicating whether the bottle is to be accepted or rejected.

If the bottle is to be accepted, the storage element 18c transmits a signal to the programmer 14 resetting the latter and commencing a new cycle. If, on the other hand, a bottle is to be rejected, the storage element 18c transmits a signal to the direction circuit 19 which, in turn, transmits to the relay amplifier 20a to operate the magnetic valve for rejecting the bottle. The decision circuit 19 operates in conjunction with the storage element 18d receiving the impulses generated by the interruption of the light beam associated with the apparatus 38. When the signal rejecting a bottle is transmitted from 18d to the decision circuit 19, the relay amplifier is operated upon the coincidence of a signal from the storage element 18c. When the latter transmits to the circuit 19, and no reject signal is received by same from storage element 18d, the bottle is accepted and relay amplifier 20a is not operated. With the operation of magnetic valve 20, the pneumatic cylinder 12a actuates the piston 12 and removes the rejected bottle from the conveyor line.

While the invention has been illustrated and described as embodied in the testing of internal diameter of bottle necks, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A testing arrangement for testing articles comprising, in combination, testing means adapted to test whether an article has certain predetermined characteristics, said testing means comprising a gage for testing the diameter of an opening, said gage having means for determining whether said diameter is within predetermined limits; a light-generator and a light-sensing device operating in conjunction with said gage, said gage having means for interrupting a light beam emitted by said generator, a predetermined number of times when said diameter is within said tolerance limits; conveying means for conveying the articles to be tested to said testing means and moving the articles from said testing means; rejection means associated with said testing means for removing articles which do not have said predetermined characteristics from said testing means, so that they are not conveyed away from said testing means by said conveyor means; electronic operating means for operating said testing means and rejection means for each article conveyed to said testing means by said conveyor means; and actuating means initiated by each of the articles when the same is conveyed by said conveyor means to said testing station and actuating, for the respective article, said testing means and rejection means if required.

2. A testing arrangement for testing articles, comprising, in combination, testing means adapted to test whether an article has certain predetermined characteristics; conveying means for conveying the articles to be tested to said testing means and moving the article from said testing means, said articles being arbitrarily spaced on said conveying means; rejection means associated with said testing means for removing articles which do not have said predetermined characteristics from said testing means, so that they are not conveyed away from said testing means by said conveyor means; electronic operating means actuated by said articles upon arrival at said testing means for operating said testing means and rejection means for each article conveyed to said testing means by said conveyor means, said electronic operating means including a pre-programmed counting arrangement initiated when said article to be tested is located at said testing means, and transmitting a cycle of sequential signals for carrying out the testing of said article; and actuating means initiated by each of the articles when the same is conveyed by said conveyor means to said testing station and actuating, for the respective article, said testing means and rejection means if required.

3. A testing arrangement according to claim 2, including storage means associated with said electronic operating means and actuated thereby, said storage means storing controlling functions for carrying out said testing of said articles.

4. A testing arrangement for testing articles comprising, in combination testing means adapted to test whether an article has certain predetermined characteristics, said testing means comprising a gage for testing the diameter of an opening, said gage having means for determining whether said diameter is within predetermined limits; a light-generator and a light-sensing device operating in conjunction with said gage, said gage having means for interrupting a light beam emitted by said generator, a predetermined number of times when said diameter is within said tolerance limits; conveying means for conveying the articles to be tested to said testing means and moving the articles from said testing means, said articles being arbitrarily spaced on said conveying means; rejection means associated with said testing means for removing articles which do not have said predetermined characteristics from said testing means, so that they are not conveyed away from said testing means by said conveyor means; electronic operating means actuated by said articles upon arrival at said testing means for operating said testing means and rejection means for each article conveyed to said testing means by said conveyor means, said electronic operating means generating a cycle of signals in a predetermined sequence for carrying out the testing of said article when said article is located at said testing means; and actuating means initiated by each of the articles when the same is conveyed by said conveyor means to said testing station and actuating, for the respective article, said testing means and rejection means if required.

5. A testing arrangement according to claim 4, wherein said gage comprises a shaft having relatively small and large diameter portions and a collar secured to said shaft, said diameter of said opening being within said limits when sad smaller diameter portion and not said larger diameter portion of said shaft passes through said opening.

6. A testing arrangement for testing articles comprising, in combination, testing means adapted to test whether an article has certain predetermined characteristics; conveying means for conveying the articles to be tested to said testing means and moving the articles from said testing means, said articles being arbitrarily spaced on said conveying means; rejection means associated with said testing means for removing articles which do not have said predetermined characteristics from said testing means so that they are not conveyed away from said testing means by said conveyor means; electronic operating means actuated by said articles upon arrival at said testing means for operating said testing means and rejection means for each article conveyed to said testing means by said conveyor means, said electronic operating means generating a cycle of signals in a predetermined sequence for carrying out the testing of said article when said article is located at said testing means; and actuating means initiated by each of the articles when the same is conveyed by said conveyor means to said testing station and actuating, for the respective articles, said testing means and rejection means if required.

7. A testing arrangement according to claim 6, including means for accurately locating and holding said article with respect to said testing means.

8. A testing arrangement according to claim 7, wherein said means for accurately locating and holding said article comprises a holder carrying two rollers mounted thereto so that said article may be located by being in contact with said rollers, and means for pressing said articles to cause latter to bear against said rollers.

9. A testing arrangement according to claim 6, wherein said articles are bottles whose internal diameters at the neck thereof are to be tested.

10. A testing arrangement according to claim 6, wherein said testing means comprises a gage for testing the diameter of an opening, said gage having means for determining whether said diameter is within predetermined limits.

11. A testing arrangement for testing articles, comprising, in combiantion, testing means adapted to test whether an article has certain predetermined characteristics; conveying means for conveying the articles to be tested to said testing means and moving the article from said testing means; rejection means associated with said testing means for removing articles which do not have said predetermined characteristics from said testing means, so that they are not conveyed away from said testing means by said conveyor means; electronic operating means for operating said testing means and rejection means for each article conveyed to said testing means by said conveyor means, said electronic operating means including a preprogrammed counting arrangement initiated when said article to be tested is located at said testing means, and transmitting sequential signals for carrying out the testing of said article; acuating means initiated by each of the articles when the same is conveyed by said conveyor means to said testing station and actuating, for the respective article, said testing means and rejection means if required; and a light beam and light-sensing means, said light beam being situated in the path of said articles and at said testing means and being interrupted by said article when latter arrives at said testing means, said sensing means sensing the interruption of said light beam and generating thereby a signal for initiating said counting arrangement.

References Cited

UNITED STATES PATENTS

| | | | |
|---|---|---|---|
| 2,407,062 | 9/1946 | Darrah | 209—82 |
| 3,100,570 | 8/1963 | White | 209—82 |
| 3,247,964 | 4/1966 | Doud et al. | 209—82 |
| 2,873,855 | 2/1959 | McCormick | 209—90 |

ALLEN N. KNOWLES, Primary Examiner

U.S. Cl. X.R.

209—74, 82